United States Patent Office 2,856,379
Patented Oct. 14, 1958

2,856,379
OPTICAL CEMENT AND METHOD OF MAKING SAME

Edward Carnall, Jr., Philadelphia, Pa., and John J. Lugert, Pittsford, N. Y., assignors to Eastman Kodak Company, Rochester, N. Y., a corporation of New Jersey No Drawing. Application July 20, 1956
Serial No. 599,033

10 Claims. (Cl. 260—33.8)

This application is a continuation-in-part of our copending application Serial No. 553,444, filed December 16, 1955, now abandoned, which in turn was a continuation-in-part of application Serial No. 411,556, filed February 19, 1954, now U. S. Patent 2,768,108.

This invention relates to a method of producing gel type optical cements. Optical components joined with this material can be aligned by any one of the customary procedures employed by the optical industry. These gel cements have the important advantage that they will hold lens elements in an aligned position before and during polymerization of the cement layer without the use of a clamping fixture. With ordinary liquid optical cements, the optical components must be aligned with a clamping device and held in the aligned position by the clamping fixture until the cement is hard.

For many years Canadian balsam has been used where lenses were to be aligned by optical means. In one such procedure the lens was prewarmed and Canadian balsam put on the surface to be contacted. The lens was rotated in a spindle and adjusted until an object, usually a small light source, seen reflected in the surface did not describe a circle as the lens rotated. Where this condition was attained the alignment was complete and optically correct. The use of Canadian balsam is now generally being abandoned on high quality optics because the stability of balsam cement is in many cases not sufficient to meet the requirements of modern optical equipment.

In the patent application we have referred to certain properties which it is desirable to provide in lens cements, such as clarity, high adhesive strength and durability characteristics, a desirable degree of elasticity, low shrinkage, and stability over long periods of time. It is also important that the cement be practically immune to the effects of variations in temperature, and this is particularly important and difficult to obtain to a sufficient degree in the case of optical instruments intended for aircraft use, where wide temperature variations, taking place in short periods of time, are encountered. Drastic humidity conditions must also be withstood, and a good test of this quality in a cement is exposure to 95% relative humidity at 130° F. for long periods. The cements of the present invention have the property of withstanding such humidity conditions.

An object of this invention is to provide a new optical cement and method of preparing same, which will permit optical alignment of lenses much in the same way as with Canada balsam, yet does not require that the lens elements be clamped together mechanically during setting of the cement or that the lenses be prewarmed. Another object is to provide thermosetting optical cements which will withstand severe conditions as referred to above, such as high and low temperatures and high humidity conditions.

To obtain these objectives we have found that (1) the cement must be a good optical cement as normally used, i. e., applied as a liquid and then polymerized; (2) the cement must be a three-dimensional cross-linked polymer when polymerized; and (3) gelation of the cement should occur early in the polymerization (10–30% of the reaction having occurred. The novel cement to which the invention is directed contains (1) about 40–60% of a diallyl compound such as diallyl phthalate, diallyl benzene phosphonate, or diallyl diethylene glycol dicarbonate; and (2) 60–40% of an unsaturated polyester, or 60–40% of a 70–30% to 30–70% mixture of an unsaturated polyester and a chlorinated biphenyl, this material being marketed under the name "Arochlors" by the Monosanto Chemical Company, or 60–40% of an acrylic type compound with a small percentage of a divinyl monomer such as divinyl benzene; and (3) a catalyst for the acceleration of the copolymerization of reactive groups in the composition, examples of suitable catalysts being benzoyl peroxide, acetyl peroxide, phthalic peroxide, lauric peroxide, similar per compounds, etc. Lenses made with these cements are useful in the range of −65° to +160° F.

Of the "Arochlors," numbers 1242, 1248, 1254 and 1262 have been found to provide successful results, but number 1260 has been found to be best.

The two or more components are blended to form a homogeneous solution. A part of the solution is then heated until a gel of the proper consistency, depending on the components, is formed. In order to measure the consistency, the gel is tested for needle penetration using a Penetrometer described in A. S. T. M. standard method of test for penetration of bituminous materials (A. S. T. M. designation: D5–25). A gel penetration from approximately 10 to 40 mm./30 sec./50 gms. has been found to make workable cements, penetrations in the lower portion of the 10–40 mm. range indicating presence of a hard gel, while larger penetrations indicate softer gels. Our preferred temperature for heating the solution is 70° C., but somewhat lower or higher temperatures may be used with corresponding changes in the time required to obtain a suitable gel, i. e. a longer time with a lower temperature, a shorter time with a higher temperature.

When the proper gel is formed, it is cooled at once to room temperature. At least 25% and preferably not over 1000% of the quantity of the original mixture in a more liquid condition than the gel is added to the gel. The added mixture may be either ungelled original solution or a very soft gel having a viscosity between that of the original starting solution and the lower limit of gel hardness described above. After addition of the original mixture or soft gel to the firmly gelled material, the two materials are homogenized in such a way as to reduce the gel to very small particles, well dispersed throughout the mixture. Homogenization is accomplished by forcing (under about 400 lbs./sq. in. pressure) the gel and starting solution mixture through a stainless steel screen. Three passes through a 50 mesh screen are usually enough to give satisfactory smoothness and optimum gel particle size. The percentages stated herein are by weight or volume, as they are substantially the same.

By attaining the proper gel hardness the optical components when cemented with the gel cement resists slipping when held in an inclined angle to the horizontal. In general, these gel cements are best applicable to lenses of 4-inch diameter or smaller. Certain of these gels will hold lens elements up to 1 inch in diameter without slippage, even when the joint is positioned on the vertical. Lenses larger than 4-inch diameter can of course be cemented with this composition, provided proper precautions are taken against slippage of the elements during polymerization.

For use the gel cement is placed on the surfaces of the optics to be cemented and the components put together and worked until the cement layer is free from voids and bubbles. If desirable the lens may be prewarmed in the same manner as with Canada balsam. The element is then aligned by any of the usual methods such as by rotating the element in a spindle and adjusting it until an object, preferably a small light source, seen reflected in the surfaces does not describe a circle as the lens is rotated. When this condition is attained the alignment is complete and optically correct. After alignment the optical element is placed in an oven at an appropriate temperature without any expensive fixtures or clamps until such time as polymerization is complete.

We have found that the use of high temperatures for curing lens cements should preferably be avoided since strains may be set up in the optics at excessively high temperatures and the setting up of the cement causes this abnormal condition to remain. However, the time of curing appears to vary in an inverse proportion to the temperature, so that with higher temperatures, shorter curing times are required. For instance, at 140° F., the time of curing is about five days, at 160° F. about 40 hours, and at 180° F. about 24 hours. When one of the optics to be cemented has a relatively low melting point such as gelatin then a temperature of 140° F. is indicated. At the other extreme, a temperature as high as 300° F. may be used or one as low as 120° F. A preferable temperature is 160° F. for 40 hours and the preferred range for commercial operations is about 140–220° F. In other words, a wide range of temperatures and curing times is available, limited by the extremes of temperatures so high as to be detrimental to the optical elements, and curing times so long as to be commercially impractical, although nevertheless completely operable.

*Example I*

An unsaturated polyester derived from bicyclo (2,2,1)-5-heptene-2,3 dicarboxylic anhydride and 1,2-propanediol, is made as described in said parent application, to wit, by mixing equimolar quantities of 1,2-propanediol and bicyclo (2,2,1)-5-heptene-2,3-dicarboxylic anhydride and 0.01% hydroquinone, and heating the mixture at 205–210° C. under an inert atmosphere of nitrogen, $CO_2$ or the like for 9–12 hours until the acid number of the polyester is 14–17. One part of this polyester is blended with one part of diallyl benzenephosphonate and 3% benzoyl peroxide. Two parts of the resulting solution is heated in an oil bath at 70° C. until gelation occurs. The gel is immediately cooled to room temperature. Three parts of the original solution is added to the gel and homogenized until the gelled particles are reduced to a very small size and are well dispersed throughout. Entrapped air is removed prior to use by placing the gel dispersion under a vacuum appropriate to the vapor pressure of the constituents at room temperature, that is, a vacuum just short of the vapor pressure or boiling point of less than 1 mm. For this group of cements this vacuum is roughly 1 to 5 mm. pressure. The cement is placed on the surface of one of the components and the components put together and worked until a continuous cement layer is attained. The element is then aligned by any one of the classical methods. The elements, once cemented, will not slip from their aligned position. The cemented element is carefully placed in an oven at 70° C. (about 158° F.) to complete polymerization.

*Example II*

One part of an unsaturated polyester derived from bicyclo (2,2,1)-5-heptene-2,3-dicarboxylic anhydride and 1,2-propanediol is mixed with one part of diallyl phthalate. To this solution is added 3% benzoyl peroxide. Ten grams of the resulting solution is heated until gelation occurs. The gel is immediately cooled to room temperature and then homogenized with 10 grams of the original solution as in Example I and the resulting cement may be used in the same manner.

*Example III*

One part of an unsaturated polyester derived from bicyclo (2,2,1)-5-heptene-2,3-dicarboxylic anhydride and 1,2-propanediol is blended with one part of a chlorinated biphenyl ("Arochlor 1260," product of Monsanto Chemical Company) and two parts of diallyl benzenephosphonate and 3% benzoyl peroxide. The dispersed gel-type of cement is then prepared and used as in Examples I and II above.

*Example IV*

To equal parts of n-butyl methacrylate and diallyl diethylene glycol dicarbonate is added 3% by weight benzoyl peroxide and 1½% of a 75% paradivinylbenzene, 25% 1,4-ethylvinylbenzene mixture. One half of this material is converted to a hard gel. One half of the original mixture is converted to a very light gel as occurs just at the point of transition from the liquid stage to the gelled state. The two gels are mixed together and homogenized until the gels are reduced to very small particles. The resulting cement can be used in the same manner and technique as in Examples I, II and III.

In testing cements according to the invention, quantities of different lenses were actually cemented in order to comparatively evaluate the over-all properties of these cements. For instance these cements were able to hold without slippage a lens 32.70 mm. in diameter with a 32.72 mm. radius of curvature (internal) when held at a vertical angle, that is, with the lenses on edge. Depending on the radius of curvature and thickness of the lens elements, the cements of the invention are useful in holding lens elements of 40 mm. and larger diameters during setting of the cement, without using clamping devices.

The proper choice of the constituents is important and several factors must be considered. The components of the solution must be chosen so that the resulting polymer will have the properties which will enable the optics to be subjected to both high and low temperatures or any other climatic conditions without the cement losing its adhesion or becoming crazed, or in any other way breaking down so as to impair optical performance. The index of refraction of the components of the solution should be such that on polymerization no variations in the refractive index are present which would be visible in the cured cement layer. Such variations of index are seen as a mottling effect in the cement layer. The components of the solution must contain enough reactive unsaturated linkages which are capable of undergoing polymerization so that gelation will occur, yet not so many that upon total polymerization the cured product is so highly cross-linked that the copolymer is brittle and lacks all flexibility. The shrinkage of the cement on polymerization should be as low as possible, 6–9% being acceptable for most requirements.

With this gel cement, lenses can easily and rapidly be aligned by any one of the classical methods such as: by rotating the element in a spindle, cup fixtures, clamping, dial gauge, etc. Not only are successful results obtained by mixing a hard gel with a liquid but also by taking a mixture of a hard and soft gel and producing a cement which is fully as effective as in Example III.

We believe that the hard gel actually holds the lens in position while the unpolymerized starting material or light gel acts as both a lubricant and as a vehicle for the gel. The starting material permits movement when the lens is worked to remove the bubbles and voids in the cement layer, but when the lens is in the desired position the hard gel prevents the lens from slipping.

The advantages of being able to use a gel cement are that it does not require prewarming of the lenses or the use of fixtures after the lens has been aligned, thus providing a cheaper and faster method of producing good quality lenses, and it also permits the use of modern thermosetting adhesives in place of balsam cement when it is desirable to use optical methods of alignment.

By "room temperature" as used herein, we mean about 70° F. or about 20° C., but this temperature is not critical as long as the reaction which proceeds at the elevated temperature to which the mixture is heated, is brought to a substantial halt.

This invention is not to be limited by any theory of the mechanism of operation, nor to any specific example which may have been given for the purposes of illustration, but only by the following claims in which we wish to claim all novelty inherent in our invention.

We claim:

1. An optical cement prepared by making an unsaturated polyester by mixing approximately equimolar quantities of 1,2-propanediol and bicyclo (2,2,1)-5-heptene-2,3-dicarboxylic anhydride and about 0.01% hydroquinone, and heating the mixture to 205–210° C. under an inert atmosphere for 9–12 hours until the acid number of the polyester is 14–17, mixing equal parts of the resulting polyester and diallyl benzenephosphate plus about 3% of a peroxide polymerization catalyst, heating the mixture until gelation occurs, cooling to about room temperature, and homogenizing together about 2 parts of the gel with about 3 parts of the ungelled polyester-phosphonate mixture.

2. An optical cement prepared by mixing approximately one part of the polyester described in claim 1 with approximately one part of diallyl phthalate plus about 3% of a peroxide polymerization catalyst, heating the mixture until gelation occurs, cooling the mixture to about room temperature, and homogenizing together about equal parts of the gel and the ungelled polyester-diallyl phthalate mixture.

3. A process of making an optical cement comprising mixing approximately one part of the polyester described in claim 1 with approximately one part of diallyl phthalate plus about 3% of a peroxide polymerization catalyst, heating the mixture until gelation occurs, cooling the mixture to about room temperature, and homogenizing together about equal parts of the gel and the ungelled 4. An optical cement prepared by mixing approximately one part of the polyester described in claim 1 with approximately one part of chlorinated biphenyl and approximately two parts of diallyl benzenephosphonate plus about 3% benzoyl peroxide, heating the mixture until gelation occurs, cooling the mixture to about room temperature and homogenizing together a quantity of the gel and about 100–150% of the ungelled mixture based on the quantity of gel used.

5. A process of making an optical cement comprising mixing approximately one part of the polyester described in claim 1 with approximately one part of chlorinated biphenyl and approximately two parts of diallyl benzenephosphonate plus about 3% benzoyl peroxide, heating the mixture until gelation occurs, cooling the mixture to about room temperature and homogenizing together a quantity of the gel and about 100–1000% of the ungelled mixture based on the quantity of gel used.

6. A process of making an optical cement comprising making an unsaturated polyester by mixing approximately equimolar quantities of 1,2-propanediol and bicyclo (2,2,1)-5-heptene-2,3-dicarboxylic anhydride and about 0.01% hydroquinone, and heating the mixture to 205–210° C. under an inert atmosphere for 9–12 hours until the acid number of the polyester is 14–17, mixing equal parts of the resulting polyester and diallyl benzenephosphonate plus about 3% of a peroxide polymerization catalyst, heating the mixture until gelation occurs, cooling to about room temperature, and homogenizing together about 2 parts of the gel with about 3 parts of the ungelled polyester-phosphonate mixture.

7. An optical cement prepared by mixing approximately equal parts of n-butyl methacrylate and diallyl diethylene glycol carbonate with about 3% of a peroxide polymerization catalyst and 1½% of 3 to 1 mixture of para divinylbenzene and 1,4-ethylvinylbenzene, heating a first portion of the mixture until a hard gel is formed, heating a second portion of the mixture to form a very light gel, and homogenizing together approximately equal portions of the two gels.

8. A process of making an optical cement comprising mixing approximately equal parts of n-butyl methacrylate and diallyl diethylene glycol carbonate with about 3% of a peroxide polymerization catalyst and 1½% of 3 to 1 mixture of paradivinylbenzene and 1,4-ethylvinylbenzene, heating a first portion of the mixture until a hard gel is formed, heating a second portion of the mixture to form a very light gel, and homogenizing together approximately equal portions of the two gels.

9. A process of making a gel cement particularly useful for optical purposes and capable of maintaining glass lens elements to be cemented in the desired position relative to each other during setting of the cement without the use of mechanical means such as clamps for holding the elements in position, said process comprising forming a homogeneous blend of (a) about 40–60% of a diallyl compound selected from the group consisting of diallyl phthalate, diallyl benzene phosphonate, and diallyl diethylene glycol dicarbonate; (b) about 60–40% of an unsaturated polymerizable composition selected from the group consisting of (I) an unsaturated polyester derived by reacting bicyclo(2,2,1)-5-heptene-2,3-dicarboxylic anhydride and a dihydric alcohol, and (II) a mixture of n-butyl methacrylate with a small percentage of a divinyl monomer; and (c) a peroxide polymerization catalyst, heating the blend to form a soft gel, cooling the gel to about room temperature, adding to the gel from about 25–1000% of the blend which has been prepared but has not been heated to form a soft gel, and homogenizing the mixture to reduce the gel to very small particles well dispersed throughout the mixture.

10. An optical cement made in accordance with the process of claim 9.

References Cited in the file of this patent

UNITED STATES PATENTS

| | | |
|---|---|---|
| 2,370,578 | Pollack et al. | Feb. 27, 1945 |
| 2,543,636 | Loritsch | Feb. 27, 1951 |
| 2,568,658 | Pope | Sept. 18, 1951 |
| 2,586,885 | Toy et al. | Feb. 26, 1952 |
| 2,768,108 | Carnall et al. | Oct. 23, 1956 |

UNITED STATES PATENT OFFICE

CERTIFICATE OF CORRECTION

Patent No. 2,856,379                                            October 14, 1958

Edward Carnall, Jr., et al.

It is hereby certified that error appears in the printed specification of the above numbered patent requiring correction and that the said Letters Patent should read as corrected below.

Column 5, line 21, for "benzenephosphate" read -- benzenephosphonate --; line 41, after "ungelled" insert -- polyester-diallyl phthalate mixture. --.

Signed and sealed this 20th day of January 1959.

(SEAL)

Attest:

KARL H. AXLINE                                                       ROBERT C. WATSON

Attesting Officer                                                  Commissioner of Patents